(12) United States Patent
Oertel

(10) Patent No.: US 8,947,496 B2
(45) Date of Patent: Feb. 3, 2015

(54) METHOD AND ARRANGEMENT FOR CONNECTING AT LEAST ONE MAN-MACHINE INTERFACE FOR MANIPULATING AT LEAST ONE DATA SOURCE CONNECTED TO A VIDEO CONFERENCING SYSTEM WITHIN THE SCOPE OF VIDEO CONFERENCES

(75) Inventor: Norbert Oertel, Landshut (DE)

(73) Assignee: Unify GmbH & Co. KG, Munich (DE)

( * ) Notice: Subject to any disclaimer, the term of this patent is extended or adjusted under 35 U.S.C. 154(b) by 936 days.

(21) Appl. No.: 13/121,308

(22) PCT Filed: Sep. 24, 2009

(86) PCT No.: PCT/EP2009/006913
§ 371 (c)(1),
(2), (4) Date: Jun. 23, 2011

(87) PCT Pub. No.: WO2010/037501
PCT Pub. Date: Apr. 8, 2010

(65) Prior Publication Data
US 2011/0249084 A1    Oct. 13, 2011

(30) Foreign Application Priority Data

Sep. 30, 2008   (DE) .................. 10 2008 049 715

(51) Int. Cl.
*H04N 7/14*    (2006.01)
*H04M 3/42*    (2006.01)
*H04L 12/16*   (2006.01)
*H04Q 11/00*   (2006.01)
(Continued)

(52) U.S. Cl.
CPC ............ *H04L 65/4092* (2013.01); *H04N 7/152* (2013.01); *H04L 65/403* (2013.01); *H04L 65/4084* (2013.01)
USPC ............... 348/14.09; 348/14.08; 379/202.01; 370/260; 455/416

(58) Field of Classification Search
CPC ............ H04L 65/403; H04L 65/4084; H04L 65/4092; H04N 7/14; H04N 7/141; H04N 7/142; H04N 7/144; H04N 7/147; H04N 7/148; H04N 7/15; H04N 7/152; H04N 7/155; H04N 7/157
USPC .......... 379/14.01, 14.02, 14.03, 14.04, 14.05, 379/14.06, 14, 7, 14.08, 14.09, 14.1, 14.11, 379/14.12, 14.13, 14.14, 15.15, 14.16; 348/14.01, 14.02, 14.03, 14.04, 14.05, 348/14.06, 14, 7, 14.08, 14.09, 14.1, 14.11, 348/14.12, 14.13, 14.14, 15.15, 14.16
See application file for complete search history.

(56) References Cited

U.S. PATENT DOCUMENTS 5,657,246 A * 8/1997 Hogan et al. ............... 348/14.1
5,729,282 A * 3/1998 Okawa ..................... 348/14.12
(Continued)

FOREIGN PATENT DOCUMENTS

EP    1601196 A1    11/2005
EP    1814330 A2    1/2007
(Continued)

OTHER PUBLICATIONS
International Search Report for PCT/EP2009/006913 dated Dec. 1, 2009 (Form PCT/ISA/210) (German Translation).
(Continued)

*Primary Examiner* — Khai N Nguyen
(74) *Attorney, Agent, or Firm* — Buchanan Ingersoll & Rooney

(57) ABSTRACT

The invention relates to a method for connecting at least one man-machine interface for manipulating, particularly remotely manipulating, at least one data source connected to a video conferencing system within the scope of video conferences, wherein signals generated by the man-machine interface are transmitted to the video conferencing system via a transmission channel provided for controlling a video camera. The invention further relates to an arrangement comprising means for carrying out the method.

16 Claims, 1 Drawing Sheet

(51) Int. Cl.
*H04L 29/06* (2006.01)
*H04N 7/15* (2006.01)

(56) References Cited

U.S. PATENT DOCUMENTS

| | | | |
|---|---|---|---|
| 6,122,005 A * | 9/2000 | Sasaki et al. | 348/211.3 |
| 7,231,384 B2 | 6/2007 | Wu et al. | |
| 7,321,384 B1 * | 1/2008 | Wu et al. | 348/14.08 |
| 2002/0018114 A1 * | 2/2002 | Shibata et al. | 348/14.07 |
| 2005/0024485 A1 * | 2/2005 | Castles et al. | 348/14.03 |
| 2005/0093970 A1 * | 5/2005 | Abe et al. | 348/14.05 |
| 2006/0059431 A1 * | 3/2006 | Pahud | 715/751 |
| 2006/0077252 A1 | 4/2006 | Bain et al. | |
| 2007/0002128 A1 * | 1/2007 | Sawada | 348/14.01 |
| 2007/0126858 A1 | 6/2007 | Bain et al. | |
| 2007/0171273 A1 * | 7/2007 | Saleh et al. | 348/14.08 |
| 2008/0068444 A1 * | 3/2008 | Thielman et al. | 348/14.1 |
| 2008/0291265 A1 * | 11/2008 | Wagner et al. | 348/14.16 |
| 2011/0249084 A1 * | 10/2011 | Oertel | 348/14.08 |

FOREIGN PATENT DOCUMENTS

| | | |
|---|---|---|
| EP | 1814430 A2 | 8/2007 |
| WO | 03/063484 A1 | 7/2003 |

OTHER PUBLICATIONS

International Search Report for PCT/EP2009/006913 dated Dec. 1, 2009 (Form PCT/ISA/210) (English Translation).

Written Opinion of the International Searching Authority for PCT/EP2009/006913 dated Dec. 1, 2009 (Form PCT/ISA/237).

ITU-T Standard Superseded (S), International Telecommunication Union, Geneva, CH, "Packet-Based Multimedia Communications Systems Annex Q Far-end camera control and H.281/H.224", No. H.323 Annex Q Jul. 1, 2001.

ITU-T Standard in Force (I), International Telecommunication Union, Geneva, CH, "A Far End Camera Control Protocol for Videoconferences Using H.224" No. H.281 Nov. 1, 1994.

ITU-T Standard in Force (I), International Telecommunication Union, Geneva, CH, "A Real Time Control Protocol for Simplex Applications Using the H.221 LSD/HSD/MLP Channels"; No. H.224 Jan. 8, 2005.

International Preliminary Report on Patentability for PCT/EP2009/006913 dated Apr. 5, 2011 (Form PCT/IB/373, PCT/ISA/237) (German Translation).

International Preliminary Report on Patentability for PCT/EP2009/006913 dated Apr. 5, 2011 (Form PCT/IB/373, PCT/ISA/237) (English Translation).

* cited by examiner

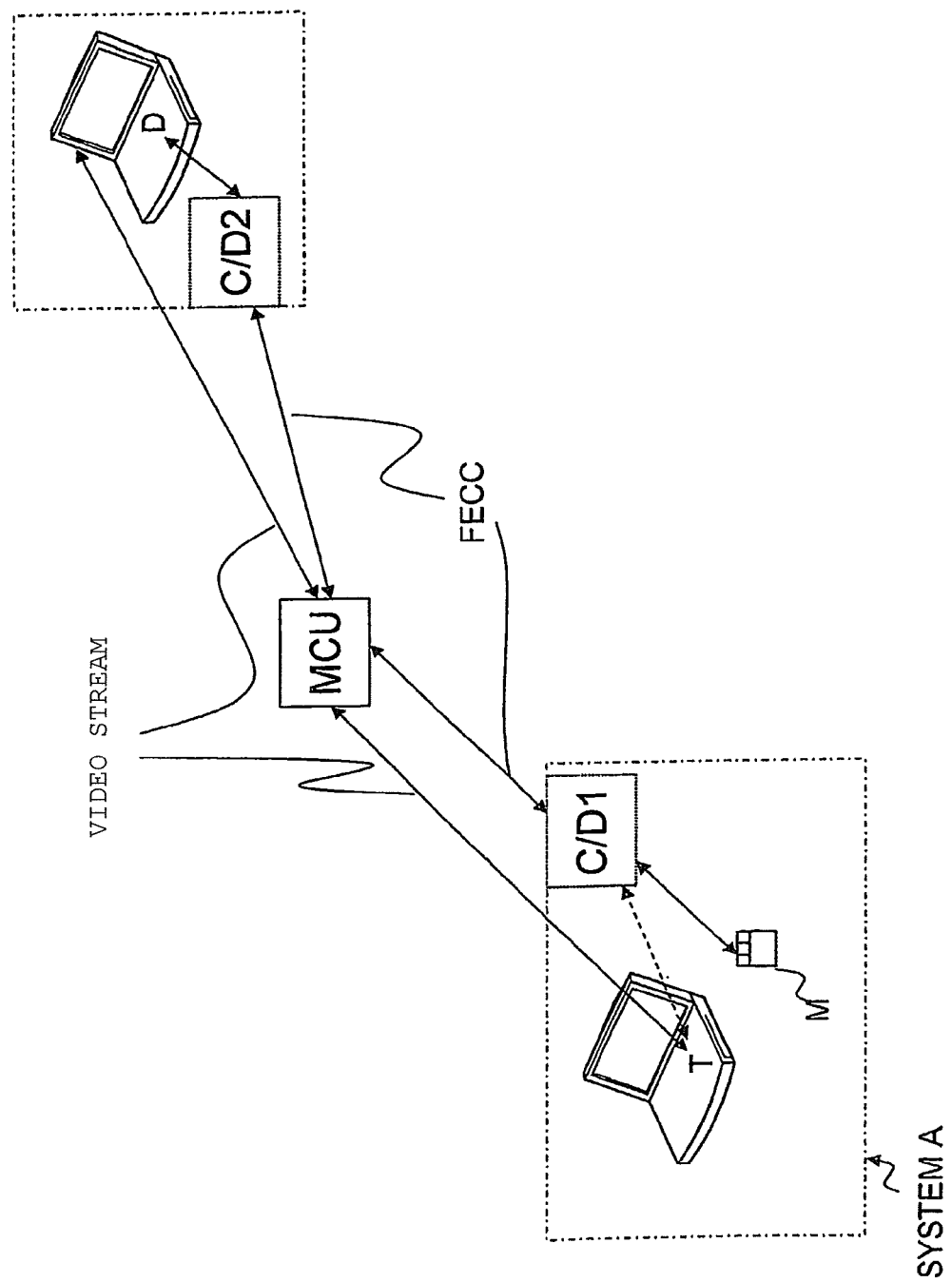

METHOD AND ARRANGEMENT FOR CONNECTING AT LEAST ONE MAN-MACHINE INTERFACE FOR MANIPULATING AT LEAST ONE DATA SOURCE CONNECTED TO A VIDEO CONFERENCING SYSTEM WITHIN THE SCOPE OF VIDEO CONFERENCES

CROSS-REFERENCE TO RELATED APPLICATIONS

This application is the United States national phase under 35 U.S.C. §371 of PCT International Application No. PCT/EP2009/006913, filed on Sep. 24, 2009, and claiming priority to German Application No. 10 2008 049 715.0, filed on Sep. 30, 2008.

BACKGROUND OF THE INVENTION

1. Field of the Invention

Embodiments relate to methods for connecting at least one man-machine interface for manipulation of at least one data source connected to a video conferencing system within the scope of video conferences as well to arrangements for connecting at least one man-machine interface for manipulation of at least one data source connected to a video conferencing system in the scope of video conferences.

2. Background of the Related Art

During communication with remote conversation partners, transmitting image data, especially video data, in addition to voice data for holding conferences is well-known. To this end, so-called video conference room systems exist that essentially follow the standards H.320, H.323 and/or H.324.

The disadvantage of video conferences based on these standards is that visually displayable data content cannot also be viewed at the same time.

For this purpose, there is an established extension of standard H.239 (also known by the terms "People+Content" and "DualVideo") that enables slides or other visual content, for example, to be shared with conference participants and viewed at the same time using a second video stream.

Collaboration is still not possible, however, to the same extent as for a conference in which all participants are at the same location.

BRIEF SUMMARY OF THE INVENTION

Embodiments of the invention relate to a method for connecting at least one man-machine interface for manipulation, in particular remote manipulation, of at least one data source connected with a video conferencing system in the scope of video conferences, in which the signals generated by the man-machine interface are transmitted to the video conferencing system via a transmission channel provided for controlling a video camera.

Through an embodiment of the invented method, the existing man-machine interfaces are integrated into the video conference systems, and also an inverse channel to the data source is created so that "shared working" is enabled. A further advantage of the invented method lies in its simple execution, which makes it possible to implement the inverse channel in room systems configured as in the prior art, which so far has been impossible despite the standard T.120 established for this purpose, because it was too complex for implementation in room systems.

If the invented method of this type is further developed such that a man-machine interface associated with the video conferencing system is used as the man-machine interface, then managed control of data sources, especially remotely assigned sources, is possible from a central site.

As an alternative or extension, in a further embodiment of the invention, a man-machine interface associated with a participant terminal of the video conferencing system, such as a wireless keyboard or wireless mouse, can be used as the man-machine interface. This allows one of the participants to control the data source.

If the participant terminal is already suitable for control, because it has an alphanumeric keyboard or enables voice control through speech recognition, for example, then a participant terminal of the video conferencing system is preferably used as the man-machine interface.

The invention is preferably further developed such that the transmission channel is operated according to "Far End Camera Control" FECC, in particular using the H.281 and/or H.224 protocols. As a result, the invention is easier to implement and can be used without major adjustments, based on the widespread prevalence of these standards in popular devices and systems.

The video conferencing system preferably routes the received signals to at least one data source, so that remote associated data sources in particular can be controlled by participants in the conference.

In a further advantageous embodiment of the invention, the signals are decoded by a decoding device associated with one of the data sources, in such a way that the signals are extracted from a data stream transmitted over the transmission channel according to a transmission protocol of the transmission channel and are the basis of the manipulation. As a result, further advantageous effects can be supported, such as a multiplex of several signals, the generation of virtual channels on a camera control channel and, last but not least, the encapsulation of control commands in the form required by the transmission protocol.

Preferably the data source is associated with a type of encoding device such that the required responses for the signal source are added to the data stream of the transmission channel. As a result, error and communication protocols can be implemented that make the (remote) control more resistant to disruption.

Also advantageous is the embodiment according to which the data source signals its availability for manipulation over the transmission channel via a video channel of the video conferencing system. As a result, participant terminals that support this method correspondingly make users aware of this service feature.

The arrangement according to the invention for configuring terminals, in which at least parts of the first configuration data are supplied to a smart card of a terminal during configuration, is distinguished by a means for carrying out the method or one of its embodiments and thereby achieves the advantageous contribution of offering an implementation that realizes the advantages of the method.

Additional advantages and details about the invention are explained using the exemplary embodiments of the invention shown in the following FIGURE.

BRIEF DESCRIPTION OF THE FIGURE

The FIGURE shows a simplified manipulation sequence according to an embodiment of the invented method and one of the arrangements to implement it.

DETAILED DESCRIPTION OF THE INVENTION

As an exemplary embodiment of the invention, a video conferencing system implemented as a room system according to the invented method is shown in the FIGURE. This system comprises a video conferencing device MCU for control provided from the room system, as well as a first participant terminal SYSTEM_A and a second participant terminal SYSTEM_B.

Both participant terminals SYSTEM_A, SYSTEM_B are assumed to be laptops in the following embodiment of the invented arrangement.

The first participant terminal SYSTEM_A is to take the role of one of the devices remotely controlling a data source D_AP of the video conferencing system in the scenario shown.

The data source D_AP is thereby the laptop memory related to the second participant terminal SYSTEM_B, where the data to be manipulated are application data that the conference participants are to process together in the embodiment shown.

For remote control, the first participant terminal SYSTEM_A has a (wireless) mouse M as well as a typical laptop keyboard available.

According to the example shown, the mouse M is to perform an action in real time that is captured as an event (interrupt control) and evaluated.

The movement of the mouse M represents a command that controls the application, or more precisely, the mouse pointer of the application.

To that end, according to the embodiment of the invention, the command is converted locally on the first participant terminal SYSTEM_A, using a process C/D1 performed on the laptop, in such a way that it is transmitted as a command generated according to a Far End Camera Control protocol, via a channel actually intended for video camera control, to the controlling device MCU, which then transmits it in a further step to the participant terminal involved and operated in a video conferencing session. In this example, the second participant terminal SYSTEM_B.

With which the desired operation can be carried out, according to the example of the invention, data received on the camera control channel by the second participant terminal SYSTEM_B are sent to a second conversion process C/D2 also running on the laptop.

The second conversion process detects and decodes the command corresponding to mouse movement according to the scenario and converts it into signals that a mouse connected to the laptop would generate analogously, so that the application running on the laptop is correspondingly controlled, i.e., the mouse pointer changes its position corresponding to the movement performed by the mouse M.

It should be understood here that, based on the invention, the otherwise typical processes of a person speaking to relay instructions for changing the position of the mouse pointer (or other actions for controlling the application) while viewing it together, and the document being processed then being manipulated onsite, are no longer required. This inefficient, error-prone and time-consuming process is therefore advantageously replaced by means of the invention.

The embodiment of the invention shows that it is already possible, with the video conferencing infrastructure available today, to transmit control actions in addition to the audio, video and presentation streams in which just one channel, which otherwise is opened to control a remote camera ("Far End Camera Control" FECC, H.281 via H.224), is used.

Popular control devices (Multipoint Control Unit), such as the device MCU according to the example, are typically able to route these commands received from the first participant terminal SYSTEM_A to the second participant terminal SYSTEM_B involved in the conference, when this has been selected in advance by the first participant terminal SYSTEM_A.

The first participant terminal SYSTEM_A, according to the embodiment of the invention, also has a keyboard in addition to the mouse M, from which (interrupt) events may be triggered (shown as a dotted line). These events are also encoded as FECC commands as explained above and sent via the negotiated FECC channel to the second participant terminal SYSTEM_B.

The decoder C/D2 available in the second participant terminal SYSTEM_B also extracts the corresponding keyboard events from the FECC command stream for this purpose and reconstructs them locally. Thus, it is possible for the first participant terminal SYSTEM_A to execute keyboard and mouse input on the second participant terminal SYSTEM_B via a shared data stream on the video conferencing system. As an extension to the example explained, the second participant terminal SYSTEM_B can implement an inverse channel protocol using FECC, in order to confirm data received or request data again, for example.

A further embodiment (not shown) includes providing the option for the user of the second participant terminal SYSTEM_B to decide from which involved system keyboard and mouse commands are allowed. According to the embodiment, an incoming control query is identified for this via the FECC channel, a message is delivered to the user, and the response is awaited.

The second participant terminal SYSTEM_B, which is a laptop (notebook computer), implements its video conference function with software that establishes a connection to the video conferencing system MCU via H.323.

In a variation (not shown), a visual prompt can be sent back over the video stream that tells the first participant terminal SYSTEM_A to accept keyboard and mouse events via the FECC channel. This distinguishes the second participant terminal SYSTEM_B from other systems that do not offer this option.

This allows the invention to be further developed such that this visual prompt can also contain information about which room system has the audio and video stream associated with the presentation available. This can occur, for example, via a machine-readable display of the phone number of this participant.

The central device MCU can further have a unit for recognizing this display and can automatically make an assignment based on this information and, in particular, emphasize or display the corresponding speaker.

The first participant terminal SYSTEM_A could be directly integrated into a room system, but it would also be conceivable for it to act through a separate device, which could thereby also open its own H.323 connection to the conferencing system.

Further embodiments that are not shown could be that the first participant terminal SYSTEM_A is configured as a keyboard-like device with a built-in trackball that is connected to a local network via WLAN. In addition, it could be configured so that it has an embedded system which is able to establish a connection to the video conferencing system using H.323 and to transmit keyboard and mouse events via the FECC channel according to the invention.

Alternatively, the functionality of the first participant terminal SYSTEM_A can be directly integrated as hardware or software in a video conferencing room system and the keyboard and mouse events be received via connected USB devices.

A further variation allows the second participant terminal SYSTEM_B to be a software product which can be installed on any conventional notebook computer and which implements the functionality according to the invention.

Alternatively, the functionality could be integrated into a video conferencing room system that is connected to a notebook via USB and passes on the received events to the notebook via an emulated USB mouse or keyboard. In this case, no software installation is required on the notebook, which makes this embodiment especially advantageous.

All further developments have in common that they are able to advantageously implement the transmission of keyboard and mouse events without having to open a separate communication link between the participant terminal SYSTEM_A and the second participant terminal SYSTEM_B. This is otherwise impossible without a direct IP connection.

The invention claimed is:

1. A method of connecting at least one man-machine interface for remote manipulation of application data stored in a data source connected to a video conference system, the method comprising:
generating first signals by a first man-machine interface of a first terminal, the first signals generated to manipulate application data stored in the data source,
transmitting, by the first terminal, the first signals to the video conference system via a transmission channel provided to control a video camera during a video conference, the first and second terminals being communicatively connected to each other for the video conference via the video conference system, the first signals being generated to provide instructions for manipulation of the application data stored in the data source to manipulate the application data;
receiving the first signals sent from the first terminal, by the second terminal, via the transmission channel;
in response to the received first signals, communicating a message by the second terminal to query a user of the second terminal whether the application data is to be controlled by the second terminal via the received first signals,
the second terminal manipulating the application data based on the received first signals when a response to the message indicates the control of the application data based on the received first signals is permitted, and
the second terminal not adjusting the application data in accordance with instructions provided by the first signals when the response to the message indicates the control based on the received first signals is not permitted.

2. The method of claim 1, comprising sending second signals to the first terminal via the transmission channel by the second terminal to indicate availability for application data control to be effected by the first signals of the first terminal.

3. The method of claim 1, wherein the first man-machine interface is a man-machine interface associated with the video conference system.

4. The method of claim 1, wherein the first terminal is a laptop computer and the second terminal is a laptop computer.

5. The method of claim 1, wherein the transmission channel provided to control the video camera is a single transmission channel and the first signals are generated to manipulate presentation stream data of the video conference.

6. The method of claim 1, wherein the transmission channel is a single transmission channel and the method further comprises operating the transmission channel according to a Far End Camera Control ("FECC").

7. The method of claim 6, wherein the FECC is operated using a protocol selected from the group consisting of H.281 protocol and H.224 protocol.

8. The method of claim 1, wherein the data source is not a video camera, and the method further comprises:
receiving the first signals sent by the first terminal by a video conferencing device of the video conference system and the video conferencing device forwarding the first signals received from the first terminal to the second terminal.

9. The method of claim 8, comprising decoding the first signals received via the transmission channel by a decoding device associated with the second terminal.

10. The method of claim 1, wherein the generating first signals by the first man-machine interface of the first terminal comprises moving a first mouse connected to the first terminal such that changes in a position of the first mouse results in generation of first signals that instruct the second terminal to cause an adjustment to positioning of a mouse pointer being displayed by the second terminal to occur that corresponds with the movement of the first mouse.

11. The method of claim 1, wherein the first man-machine interface is comprised of at least one of a keyboard connected to the first terminal and a first mouse connected to the first terminal and wherein the data source is not a video camera.

12. A system for connecting at least one man-machine interface for remote manipulation of application data of an application of at least one data source, the system comprising:
a first terminal having a first non-transitory memory, the first non-transitory memory having the application data for the application;
a second terminal connected to a man-machine interface; and
the first terminal being communicatively connected to the second terminal via a channel of communication provided to control a video camera;
wherein the man-machine interface of the second terminal is configured to generate first signals to manipulate the application data, the first signals being generated for transmission along the channel of communication for sending to the first terminal to effect manipulation of the application data by the first terminal such that the application data manipulated by the man-machine interface of the second terminal is displayed analogously by the first terminal; and
wherein the first terminal is configured to send a message to query a user of the first terminal whether control of the application data by the first terminal via the received first signals is permissible,
the first terminal manipulating the application data based on the received first signals when a response to the message indicates the control of the application data based on the received first signals is permitted, and
the first terminal not manipulating the application data in accordance with instructions provided by the first signals when the response to the message indicates the control based on the received first signals is not permitted.

13. The system of claim 12, wherein the man-machine interface of the second terminal is comprised of at least one of a mouse and a keyboard; and
wherein the second terminal is configured such that movement of the mouse results in generation of the first signals to be transmitted to the first terminal via the channel of communication to instruct the first terminal to cause an adjustment to positioning of a mouse pointer being displayed by the first terminal to occur that corresponds with the movement of the mouse of the man-machine interface.

14. The system of claim 12, wherein the first terminal is a laptop computer and the second terminal is a laptop computer.

15. The system of claim 12, wherein the application data is not related to functioning of the video camera and wherein data relating to a presentation stream for an ongoing video conference is transmittable between the first and second terminals via the channel of communication.

16. The system of claim 12, wherein the first terminal is configured to decode the first signals to reconstruct Far End Camera Control ("FECC") data included within the first signals and is configured to implement an inverse channel protocol using FECC to confirm receipt of the FECC data within the first signals.

* * * * *